United States Patent
Qi et al.

(10) Patent No.: US 11,544,009 B2
(45) Date of Patent: Jan. 3, 2023

(54) HETEROGENEOUS COMPUTATION AND HIERARCHICAL MEMORY IMAGE SENSING PIPELINE

(71) Applicant: Black Sesame International Holding Limited, San Jose, CA (US)

(72) Inventors: Zheng Qi, Cupertino, CA (US); Qun Gu, San Jose, CA (US); Chengyu Xiong, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/316,263

(22) Filed: May 10, 2021

(65) Prior Publication Data

US 2021/0303216 A1 Sep. 30, 2021

Related U.S. Application Data

(63) Continuation-in-part of application No. 16/381,692, filed on Apr. 11, 2019, now abandoned.

(51) Int. Cl.
*G06F 3/06* (2006.01)
*G06T 1/60* (2006.01)
(Continued)

(52) U.S. Cl.
CPC .......... *G06F 3/0659* (2013.01); *G06F 3/0604* (2013.01); *G06F 3/0688* (2013.01);
(Continued)

(58) Field of Classification Search
CPC .... G06F 3/0659; G06F 3/0604; G06F 3/0688; G06F 13/28; G06F 13/4027; G06F 12/14;
(Continued)

(56) References Cited

U.S. PATENT DOCUMENTS

2012/0079148 A1\* 3/2012 Urzi .................... G06F 13/1626
710/107
2016/0182398 A1\* 6/2016 Davis .................... H04L 47/782
710/313
(Continued)

FOREIGN PATENT DOCUMENTS

CN 102193865 A \* 9/2011
CN 102622319 A \* 8/2012
(Continued)

OTHER PUBLICATIONS

Rafeeq, A. A. (2020). A Development Platform to Evaluate UAV Runtime Verification Through Hardware-in-the-loop Simulation (Doctoral dissertation, Virginia Tech) (pp. 1-98).\*

*Primary Examiner* — Sarah Lhymn
(74) *Attorney, Agent, or Firm* — Timothy T. Wang; Ni, Wang & Massand, PLLC (57) ABSTRACT

A system on a chip, including a first domain having a first processor, a first local memory coupled to the first processor, wherein the first local memory having a first memory format and a first sub-network coupled to the first processor, a second domain having a second processor, a second local memory coupled to the second processor and a second sub-network coupled to the second processor, wherein the second local memory having a second memory format which differs from the first memory format, a multi-tier network coupled to the first sub-network and the second sub-network, a global memory coupled to the multi-tier network and a multi-port DDR controller coupled to the global memory to receive, transmit and share the first local memory having the first memory format and the second local memory having the second memory format based on a predetermined criteria.

10 Claims, 3 Drawing Sheets

(51) Int. Cl.
*G06T 1/20* (2006.01)
*G06F 13/40* (2006.01)
*G06F 13/28* (2006.01)

(52) U.S. Cl.
CPC .......... *G06F 13/28* (2013.01); *G06F 13/4027* (2013.01); *G06T 1/20* (2013.01); *G06T 1/60* (2013.01)

(58) Field of Classification Search
CPC ..... G06F 2212/1052; G06T 1/20; G06T 1/60; Y02D 10/00
See application file for complete search history.

(56) References Cited

U.S. PATENT DOCUMENTS

| | | | | |
|---|---|---|---|---|
| 2016/0246714 A1* | 8/2016 | Soulie | ................ | G06F 13/1647 |
| 2018/0227146 A1* | 8/2018 | Zheng | .................. | H04L 49/109 |

FOREIGN PATENT DOCUMENTS

| | | | | | |
|---|---|---|---|---|---|
| CN | 105204583 B | * | 11/2018 | | |
| CN | 209030246 U | * | 6/2019 | | |
| CN | 112052206 A | * | 12/2020 | | |
| CN | 108776647 B | * | 4/2021 | ......... | G06F 13/4234 |

* cited by examiner

HETEROGENEOUS COMPUTATION AND HIERARCHICAL MEMORY IMAGE SENSING PIPELINE

BACKGROUND

Technical Field

The instant disclosure is related to an architecture and dataflow for a system on a chip utilized in image sensing for autonomous driving applications.

Background

The instant disclosure describes an architecture and data flow. Image sensing is an integral part of autonomous driving systems. Conditional automation level 3 (L3) and above autonomous driving systems have sensing that are continually aware and highly reliable. Level 3 allows a driver to shift safety critical functions to the vehicle. This L3 image sensing needs to support multiple sensors and utilizes multiple data processing methods to ensure redundancy and accuracy.

Image sensor inputs have increased from historically supporting one or two sensors at video graphics array (VGA) or 720p resolution at 30 frames per second (FPS) to currently supporting multiple 1080p or 4K sensors at 60 frames per second.

Image analysis needs to support low-light and high dynamic range (HDR) for driving conditions such as night vision, image analysis in tunnels, in and facing the sun, foggy or rainy weather and the like.

The sensing needs to support the detection of small objects at distances of over 100 meters. By way of comparison current smart phones have the ability to process data at sub ten giga operations per second (GPS), whereas a typically automated driving system demands 20-50 terra operations per second (TOPS), in essence, over a thousand times higher computation demand.

SUMMARY

A first example system on a chip, including a first domain having a first processor, a first local memory coupled to the first processor, wherein the first local memory having a first memory format and a first sub-network coupled to the first processor, a second domain having a second processor, a second local memory coupled to the second processor and a second sub-network coupled to the second processor, wherein the second local memory having a second memory format which differs from the first memory format, a multi-tier network coupled to the first sub-network and the second sub-network, a global memory coupled to the multi-tier network and a multi-port DDR controller coupled to the global memory to receive, transmit and share the first local memory having the first memory format and the second local memory having the second memory format based on a predetermined criteria.

A second example system on a chip, including at least two domains each having a respective processor and a respective local memory coupled to the respective processor, wherein the respective local memory having a respective memory format and a respective sub-network coupled to the respective processor, a multi-tier network coupled to each of the respective sub-networks, a global memory coupled to the multi-tier network and a multi-port DDR controller coupled to the global memory to receive, transmit and share the respective local memory in the respective memory format based on a predetermined criteria.

A second example system on a chip, including a multi-port DDR controller, wherein at least two ports of the multi-port DDR controller having different access priorities, a multi-tier network coupled to the multi-port DDR controller, a plurality of interconnected networked domains coupled to the multi-tier network, wherein memory access to the plurality of interconnected networked domains is controlled via the multi-tier network via the multi-port DDR controller, a plurality of signal processors that resolves a plurality of raw sensor data streams into a plurality of processed sensor data, at least one sensor data memory that stores the plurality of processed sensor data via the multi-port DDR controller, at least one central processor unit that analyzes the plurality of processed sensor data to yield a sensor data analysis, at least one central data memory that stores at least one result of the sensor data analysis via the multi-tier network and an output interface that outputs the at least one result of the sensor data analysis in at least one of a human readable data and a machine actionable data.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

The proposed solution incorporates multi-domain processing, a multi-tier network that connects the domains, a multi-level memory that services the domains through the multi-tier network and a multi-port DDR controller that services the combined memory needs of the domains utilizing ports to allow for different access speeds and different memory storage formats and access policies. The proposed solution will show a system of systems that integrates the disparate data formats for mutual sharing.

A system on chip (SOC) is an integrated circuit that integrates multiple processing tasks and or systems on a chip. The processing tasks may be delineated into domains on the chip.

A domain is a sub-system that may have multiple modules that perform specific processing tasks. Each domain may contain one or more domain-specific processors and one or more domain specific memories to perform the specific processing task. Each domain may be connected to other domains on the chip by a network.

A bus arbitrates multiple access agents and only allows one agent to have access of the bus for data transfer at a given time.

A network contains multiple devices and multiple point-to-point or point-to-multi-point connections to allow concurrent data transfer by multiple agents, given the restriction of singular access to a resource at any one point in time.

A network on chip (NOC) is a router based packet switching network formed between domains in an SOC. The network on chip may contain multiple connection fabrics, routers, traffic queues, traffic packetization and de-packetization, priority management and the like.

Packet switching is a method of grouping data that is transmitted over the network into data packets. Packets include a header and a payload, the header is used by the network to direct the packet to the proper domain, where the payload is extracted for use by the domain.

Connection fabric is a topology in which the domains interconnect via one or more network switches, and a router is a device that forwards packets between the domains. Traffic queues are the sequence of flow of packets from one domain to another. Traffic packetization is the conversion of data to real time transport protocol (RTP) to form a packet according to a codec and traffic de-packetization is the conversion of the packet to data that is useable by the domain. Priority management between the domains provides a link-level flow control that may be controlled independently for each domain; it allows packet transmission to be temporarily halted to avoid packet loss in the presence of congestion in the network The disclosed architecture includes an image processing flow that may be flexibly configured to support multiple sensor streams. The sensor streams may be directly processed by the centralized image signal processors as inline processing or be stored into random access memory then processed in store-n-forward processing. The signal processors may be at least one of an application specific integrated circuit (ASIC), a field programmable gate array (FPGA), a graphical processor unit (GPU) or a digital signal processor (DSP) and the like.

In the case of inline processing, the image may be temporarily buffered by on-chip bit stream memory. The buffering allows de-noising, interpolation, and the like to be performed in near real time.

In case of store-n-forward processing, multiple exposure frames of the sensor may be combined to form a high dynamic resolution (HDR) frame. The store-n-forward processing case also allows image signal processors to be bypassed for sensor streams in which the image signal processor is integrated with the image sensor.

In one example, the proposed flow allows stream processing of the video frames using a combination of computer vision functions for detection, segmentation and classification. After processing, the video stream may be encoded for storage and re-transmission over the network.

Figure 1:
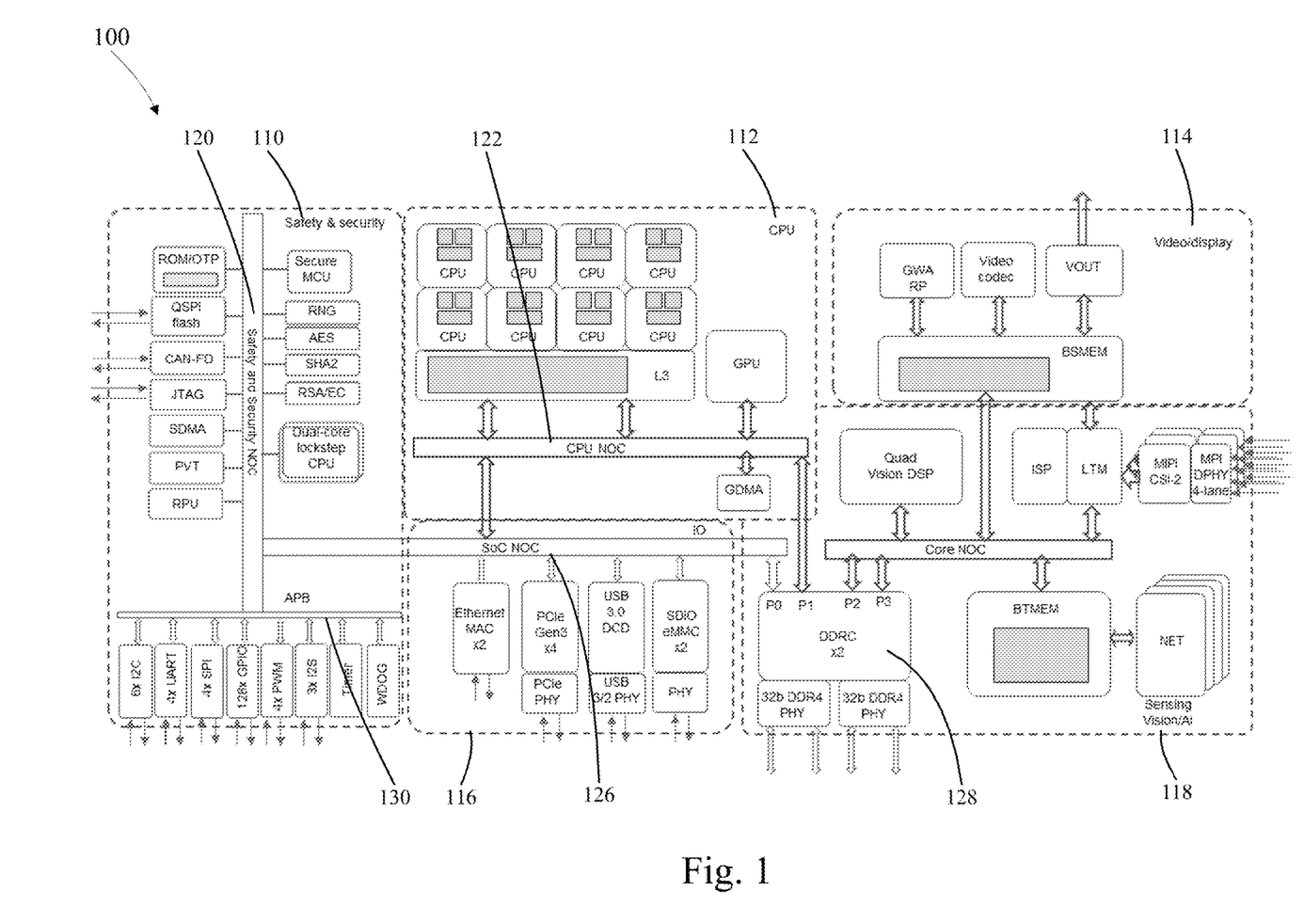
FIG. 1 is a first example system diagram in accordance with one embodiment of the disclosure.
Figure 3:
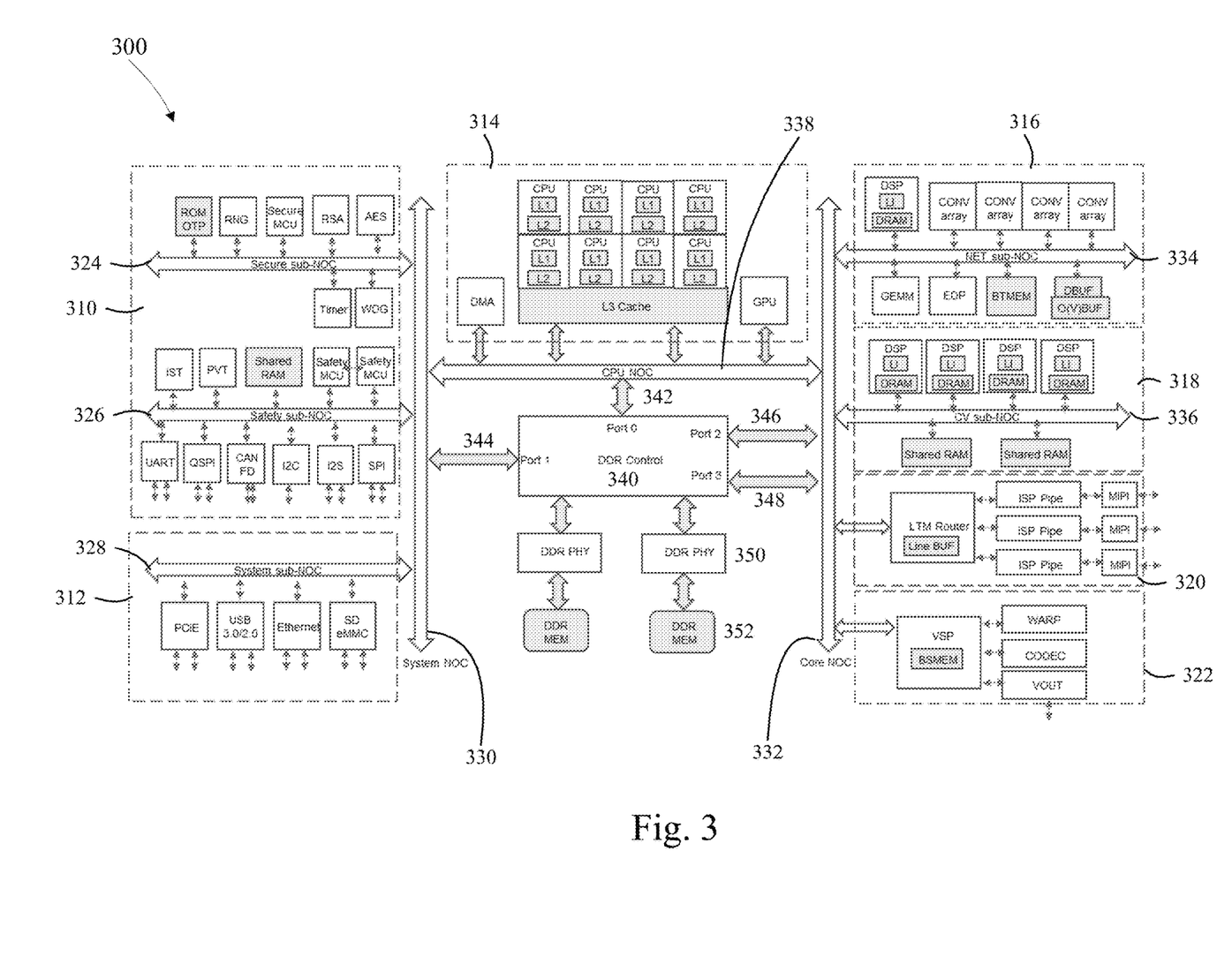
FIG. 3 is a third example system diagram in accordance with one embodiment of the disclosure.

The memory modules bitstream memory (BSMEM) in the video display domain 114 of FIG. 1 and the video stream processor domain 322 of FIG. 3 and bit test memory (BTMEM) in the sensing vision AI domain 118 of FIG. 1 and the net domain 316 of FIG. 3 are integrated into those domains. These modules serve as on-chip shared memory for inline data transfer, as well as shared direct memory access (DMA) agents for different engines to be able to access random access memory off-chip for data storage. The modules track data access requests as intelligent cache agents to maximize the utilization of on-chip random access memory (RAM) and minimize the number of random memory access requests. In cases where random access memory (RAM) access is called for, the modules combine requests, combine read data pre-fetches and coalesce writing data.

The architecture may utilize multiple types of resources, at the application level, the architecture may include multiple ARM A-class central processing units (CPUs) constructed as big.LITTLE architecture. ARM big.LITTLE is a heterogeneous computing architecture, linking less powerful processor cores (LITTLE) with more powerful processor cores (big). Both sets of cores may access to the same random access memory, allowing the processing workload to be switched between big and little cores. This architecture allows multi-core processing that adjusts computing power to dynamic workloads. The big CPUs are intended for high-level user-facing applications or high-level autonomous driving applications that integrate multi-function control such as sensing, map and localization, path planning, etc. The LITTLE CPU cores are intended for controlling small tasks.

For controlling the real-time sensing flow, several multi-threading reduced instruction set five (RISC-V) real-time controllers may be utilized. The RISC-V controllers may execute multiple control threads concurrently. The control threads may manage real-time task handling for specific sensing stages. The threads may be synchronized using an event synchronization scheme.

This architecture may utilize dedicated hardware engines optimized for specific tasks, including hardware image signal processors, high dynamic range (HDR), de-mosaic, tone mapping, de-noise, warping and computer vision functions such as stereo vision, optical flow and neural network processing functions for various layer types.

Similarly, in one example, real-time safety critical control tasks may be performed by a dedicated safety domain with two ARM R-class real-time CPUs executing in lock-step to provide redundancy.

The disclosed architecture may include a multi-level memory to provide memory bandwidth for localized processing and reduce the access frequency of global memories. In one example, to address the highly parallel processing and memory needs of a neural network, five levels of memory may be utilized.

Random access memory may be shared within the chip, the bit test memory module BTMEM may be shared by the composite Net engine, the data buffer (DBUF) is shared by multiple sub-modules and arrays, the input buffer (IBUF), weight buffer (WBUF) and output buffer (OBUF) may be shared jointly by the multiplier accumulator (MAC) array and local register and accumulators in the multiplier accumulator (MAC) cells.

The nearer the data is to computational elements, the higher frequency and bandwidth of memory access. The further away the data is from the computational elements, the more capacity may be provided.

In addition to memory for hardware, multiple cache and local RAMs are also configured for the CPUs. The ARM A-class CPUs use two-level on-chip cache, L1 caches are dedicated to the cores and L2 caches are shared by cores of the same domain. Real-time CPUs like ARM R-class safety CPU or RISC-V controllers may use a combination of L1 caches and tightly coupled memories. The tightly-coupled memories allow real-time tasks to be more deterministic.

The disclosed architecture may utilize different network-on-chips (NOCs) to partition the logic into multiple networks and domains. The memory controller utilizes multiple ports to connect different NOCs for segregating memory access traffic according to access priorities. Central processing units (CPUs) and graphics processing units (GPUs) may be connected to a low-latency cache CPU NOC running at very high speed. The SOC may be connected to a scalable System NOC to share bandwidth distribution and routing in order to achieve high speed. The sensing modules may be directly connected to the memory controller for high-priority, low-latency, real-time access. The safety CPU and safety peripherals may be connected to a separate Safety NOC for isolation and protection.

The combination of multi-tier network and multi-port DDR controller may provide separation of the different local and global traffic types. These memory traffic types may include latency sensitive, burst bandwidth traffic; real-time, high bandwidth traffic; latency sensitive, low bandwidth traffic and best effort, bulky bandwidth traffic.

FIG. 1 depicts a first example architecture 100 having a series of domains, a safety and security domain 110, a CPU domain 112, a video display domain 114, an input output (IO) domain 116 and a sensing vision AI domain 118. The domains of FIG. 1 may be connected to memory either directly or through a series of networks on chip (NOC).

The safety and security domain 110 may be connected to a safety network on chip 120 for isolation and protection. The safety NOC 120 may be connected directly to an advanced peripheral bus (APB) 130 in the IO domain 116 and the system NOC 126 within the IO domain 116. The safety NOC 120 in the safety and security domain 110 may be connected to a read only memory (ROM)/one time programmable (OTP), may provide memory that may be read at high speed, but may be programmed only once. A queried serial peripheral interface (QSPI) flash module may provide an interface commonly used to send data between microcontrollers and peripherals such as shift registers, sensors, and secure digital (SD) cards. In this example the domain may be connected to flash and may uses separate clock lines, data lines, and a select line to choose the device it communicates with. A controller area network with flexible data-rate (CAN-FD) module may provide a transmission protocol for automotive data downloads, in CAN-FD during transmission the bit rate may be increased due to the fact that no other nodes need to be synchronized. A joint test action group (JTAG) module may provide an interface for testing circuit boards utilizing a dedicated serial debug port to attain low overhead access. A space division multiple access (SDMA) module may provide a channel access method that allows parallel spatial data flows adjacent to high capacity data flows utilizing spatial multiplexing and diversity. A performance verification test (PVT) module may provide a performance test that outputs performance indicators. A remote processing unit (RPU) may provide primary or backup processing. A reconfigurable network group (RNG) module may allow run time reconfiguration and networking on the chip. An advanced encryption standard (AES) module may provide a cryptographic cypher, a secure hash algorithm 2 (SHA2) module may provide cryptographic hash functions and a Rivest, Shamir, and Adelman (RSA)/elliptic curve (EC) module may provide public-key cryptography methods. In addition the safety and security NOC may be connected to multiple processors such as ARMs and the like.

The CPU domain 112 may contain CPUs/GPUs connected to a low-latency cache CPU network on chip (NOC) 122 running at high speed. The CPU NOC 122 in the CPU domain 112 may be connected to ARM processors, their L2 cache and GPUs. The CPU NOC 122 in the CPU domain 112 may be connected directly to the memory controller 128 in the sensing vision AI domain 118 and to the system NOC 126 in the IO domain 116.

The video display domain 114 may be connected to the memory controller 128 via bit stream memory and bit test memory. The video display domain 114 may include a high definition multimedia interface (HDMI) physical layer (PHY) that allows transmission of uncompressed video data and digital audio data and a video out (VOUT) high definition multimedia interface (HDMI) may provide transmission of uncompressed video data. A video compression decompression module (CODEC) may compress data for transmission and decompress received data.

The sensing vision AI domain 118 may be connected directly to the memory controller 128 for high-priority, low-latency real-time access. The memories and processors in the sensing vision AI domain 118 may be connected directly to the memory controller 128. In this way the various NOCs and the sensing vision AI domain may be connected through the memory controller in a multi-tier network to multi-level memory. The processors in the sensing vision AI domain may be task specific processors. Each of the domains may have task specific processors. The sensing vision AI domain 118 may include a bitstream memory (BSMEM) for storage of a binary sequence of bits. A virtual instrument (VIN) module virtualizes a channel stream. A mobile industry processor interface (MIPI) camera serial interface 2 (CSI-2) module may provide a high-speed protocol for point-to-point image and video transmission between cameras and host devices. Computer vision (CV) extracts, analyzes and determines information from the video. Image signal processor (ISP) may provide a specialized digital signal processor (DSP) used in image analysis. Bit test memory (BTMEM) is a type of high speed memory for storing this type of data. A NET module is a neural net processor. A dual data rate memory controller (DDRC) may provide a random access memory controller. Thirty two bit (32b) double data rate fourth-generation synchronous dynamic random-access memory (DDR4) physical layer (PHY) is a type of synchronous dynamic random-access memory (SDRAM) with a high bandwidth (double data rate (DDR)) interface that may store data in this domain.

The IO domain 116 system NOC 126 may include an advanced peripheral bus (APB) 130 to provide management of functional blocks in multi-processor systems with multiple controllers and peripherals. The input output (10) domain 116 may be connected to a scalable system in chip (SOC) network on chip (NOC) 126 to share bandwidth distribution and routing Inter integrated circuit (I2C) may provide a two-wire interface to connect low-speed devices. A universal asynchronous receiver transmitter (UART) module may provide asynchronous serial communication in which the data format and transmission speeds are reconfigurable. A serial peripheral interface (SPI) module may provide a synchronous serial communication interface for short distance communication. A general purpose input output (GPIO) module may provide an uncommitted digital signal pin whose behavior is run-time configurable. A pulse width modulation (PWM) module emulates an analog output with a digital signal utilizing modulation, involving turning a square wave on and off. This modulation technique allows the precise control of power. An integer IC sound (I2S) module may provide a serial interface for coupling digital audio devices. A watchdog (WDOG) timer module may generate a system reset if a main program does not poll it. An Ethernet medium access control (MAC) module may provide a logical link layer that may provide flow control and multiplexing. A peripheral component interconnect express generation 3 (PCIe Gen3) to physical layer (PHY) module may provide a high-speed serial access. A Universal serial bus (USB) 3.0 dynamic content delivery (DCD)-universal serial bus physical layer (USB PHY) module may provide an interface to allow data delivery over an active channel. A secure digital card input output (SDIO) module may provide a flash based removable memory card and an embedded multimedia controller (eMMC) module may provide a storage device made up of not and (NAND) flash memory and a storage controller. The IO domain may also include a timer input.

Figure 2:
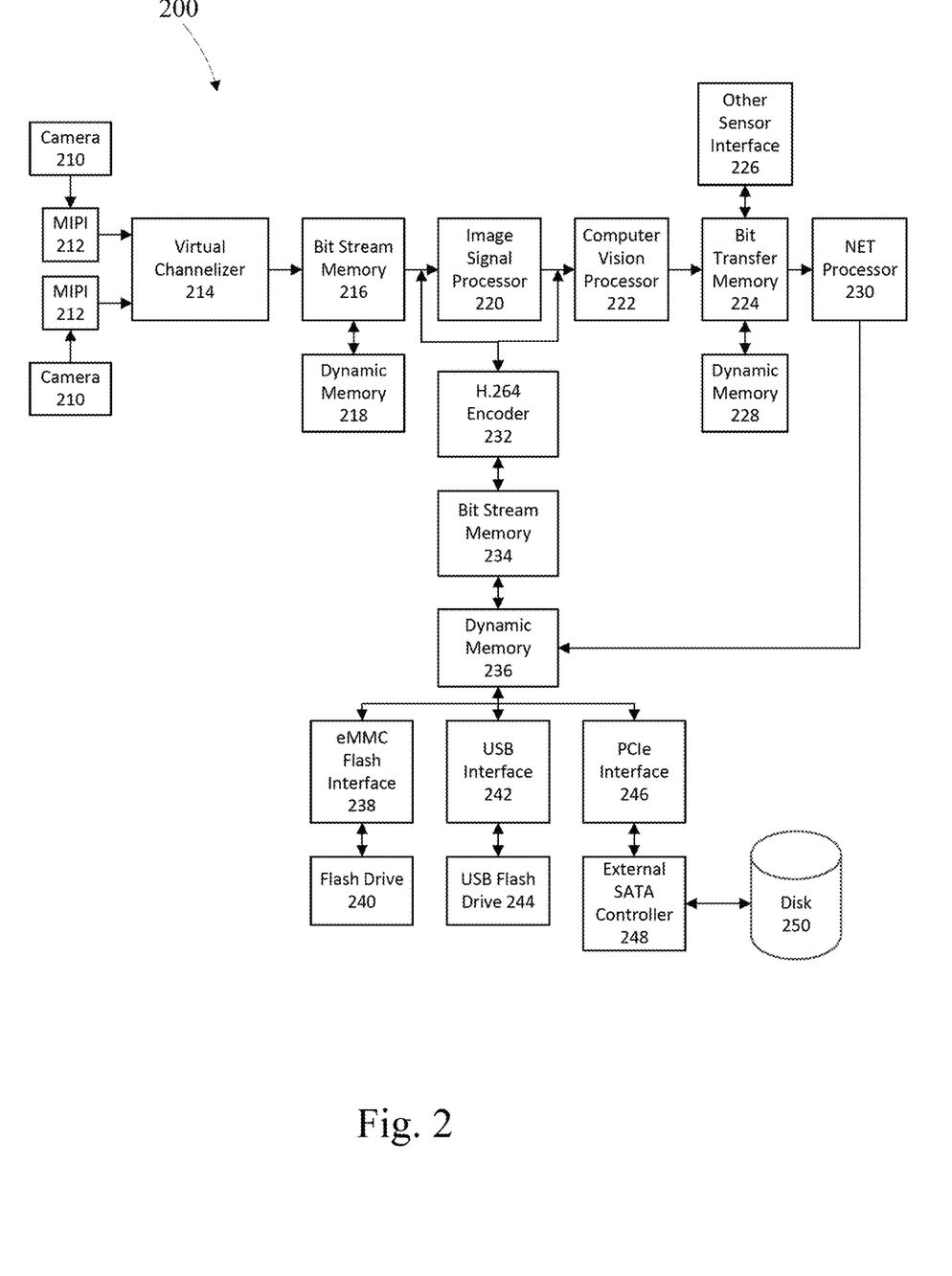
FIG. 2 is a second example system diagram in accordance with one embodiment of the disclosure.

FIG. 2 depicts a second example system architecture 200. Cameras 210 receive a video feed that is routed to MIPI interfaces 212 that is routed to virtual instrument channelizer (VIN) 214 that performs de-interleaving of the video streams. The purpose of the virtual channels is to provide separate channels for different data flows that are interleaved in a data stream. A receiver monitors a virtual channel identifier and de-multiplexes the interleaved streams to their appropriate channel. The virtual instrument channelizer 214 may be connected to a bit stream memory 216 that may be coupled to a random access memory 218. The bit stream memory 216 may be connected to an image signal processor 220 and an encoder 232. The image signal processor may provide at least one of high dynamic resolution merging, de-mosaicing, tone mapping and white balancing, de-noising, sharpening, compression, scaling and color conversion. The image signal processor 220 may be connected to computer vision processor 222. The computer vision processor 222 may provide at least one of warping, stereo vision and optical flow. The computer vision processor 222 may be connected to bit transfer memory 224, which in turn may be connected to other sensor interfaces 226, random access memory 228 and a neural net processor 230. The neural net processor 230 may provide at least one of classification, object identification, free space recognition, segmentation and sensor fusion. The encoder 232 may be connected to bit stream memory 234 and random access memory 236. The random access memory 236 may be connected to the neural net processor 230 and eMMC flash memory interface 238, USB interface 242 and PCIe interface 246. The eMMC flash memory interface 238 may be connected to flash drive 240. The USB interface 242 may be connected to a USB flash drive 244 and PCIe interface 246 may be connected to an external serial advanced technology attachment (SATA) controller 248 which in turn may be connected to external disk 250. Random access memories 218, 228 and 236 may be separate or integrated. Bit stream memories 216 and 234 may be separate or integrated.

FIG. 3 depicts a third example system 300 including a partition of the SOC into multiple domains 310, 312, 314, 316, 318, 320 and 322, grouping functions together and incorporating a processor in each domain allowing the SOC to function as system-of-systems, each having disparate processing and utilizing memory specific for that domain.

The host CPU domain 314 may provide an independent domain running user applications. The host CPU domain may control the SOC via inter-processor communication to issue processing tasks to each specific domain via the CPU NOC 338.

The multi-level memory is depicted in FIG. 3 as gray-shaded blocks in domains 310, 314, 316, 318, 320 and 322. The memory extends from local buffers to DDR memory for the system with DDR being the lowest level DDR memory 352 that is shared globally. In the proposed solution, the lower you traverse down the memory levels, the larger the memory capacity, the greater the memory generality and the larger the memory access latency, additionally the architecture utilizes specialized local memory to allow fast access and data structures specific to that domain.

The net domain 316 contains a digital signal processor (DSP) and performs artificial intelligence processing in convolutional arrays and the data for this domain may be stored in an array format. The net domain uses three dimensional (3D) tensor memory designated BTMEM as the memory format for the net domain. Tensor memory may be an array that is laid out as a single, contiguous block within memory. In one example, a 3×3×3 tensor would be stored as a single array of 27 values, one after the other. The net sub-NOC 334 may be coupled to the core NOC 332.

The computer vision (CV) domain 318 in this example contains four DSPs, and performs computer vison processing. Each of the DSPs in the CV domain has an L1 cache and associated DRAM. The CV domain also has shared random access memory (RAM). The DSP associated DRAM and the shared RAM are networked to each other and the through the CV sub-NOC 336, sub-network. The data utilized by the CV domain is 2D tiled memory as the memory format for the CV domain. Tiled memory is one in which an image is broken down into sections known as tiles so that rendering may be performed on each tile separately.

The image signal processing (ISP) domain 320 converts the data output of image sensors into video. The ISP domain contains a reduced instruction set computer (RISC-V) processor, and performs image signal processing. The RISC processor is small and highly optimized with a large number of registers. The ISP domain utilizes image processing pipelines to minimize memory bandwidth via line-buffering, where intermediate data between each stage is stored in small on-chip buffers, the line buffer is accessible via the core NOC 332, network. The ISP domain utilizes line buffer memories as the local memory format which supports multiple camera sensor line strides and image line data pipelining.

The video stream processor (VSP) domain 322 provides encoding, motion estimation and compensation of video streams. The processing within the VSP domain is based on tiled memory. Tiled memory is one in which an image is broken down into sections known as tiles so that rendering may be performed on each tile separately. The VSP domain stored the tiled memory utilizing video frame buffer streaming known as BSMEM as the memory format.

The safety and security domain 310 contains a secure microcontroller unit (MCU) and contains a read only memory (ROM) that is one time programmable (OTP). The data from the secure domain is accessible by the secure sub-NOC 324 sub-network may be coupled to the system NOC 330. The safety portion of the domain contains dual-core lock-step MCU and safety memory. The safety domain may include a shared random access memory (RAM) which is accessible via the network through the safety sub-NOC 326 which is also coupled to the system NOC 330.

The proposed solution combines disparate domain memory structures for fast local data access at extremely high bandwidth, with a number of memory levels to allow multi-domain data sharing, and larger memory capacity. The memory at the individual domain level is local memory and the grouped memory shared between the domains is termed global memory. The proposed solution combines the specific memory structure into a larger scale design for autonomous driving applications.

The multi-tier NOC manages localized traffic bandwidth, prioritizes access and provides safety and security isolation. In automotive application, the multi-tier NOC also provides redundancy and isolation of safety critical tasks from errors and interference.

In one example of the proposed solution the SOC supports on chip data flow and transfer utilizing a multi-tier NOC. In this example each NOC for that specific domain supports its primary domain function with domain specific queueing, arbitration, QOS and data routing. The SOC may implement at least one of a multi-tier NOC, a multi-NOC, a single NOC and a single bus.

The proposed solution combines multi-tier network with multi-domain and multi-level memory to minimize global traffic through sharing of data and provide security and safety isolation. The proposed solution utilizes a multi-port DDR controller 340 to separate data access for each domain so that the accesses can be provided based on predetermined criteria based on at least one of access priority and safety criticality criteria. The multi-port DDR controller 340 may be coupled through port 0 342 to the CPU NOC 338, port 1 344 may be coupled to the system NOC 330 to the system NOC 330. The multi-port DDR controller 340 may be coupled to the core NOC 332 through port 2 346 and through port 3 348.

The ports of the multi-port DDR controller 340 have different access priorities. In the proposed solution port 0 342 of the multi-port DDR may be designated for performance critical, non-real time CPU random accesses that are latency sensitive. Port 1 344 may be designated for best effort input output (IO) traffic having regular access patterns. Port 2 346 may be designated for large non-real time neural network processing traffic with regular access patterns and port 3 348 may be designated for real-time cameras or video displays. The DDR PHY 350 couples the multi-port DDR controller 340 to DDR memory 352.

Different queuing mechanisms and QOS policies may be applied to different ports, which may also allow traffic to be rearranged or merged, without head-of-line blocking. The different port designations may also allow for different DDR memory page activation policies, as well as error correction policies.

As an example, the real-time traffic (Port 3) 348 may be given highest priority of QOS, whereas the performance critical traffic (Port 0) 342 may have a variable QOS priority depending on a predetermined threshold. In another example, a port that supports a contiguous traffic pattern may have a page open policy to keep DDR page opened for continuing access. Whereas a port that supports random access may have a page close policy to minimize page conflicts.

An example method of signal processing may include at least one of partitioning memory access of a plurality of interconnected networked domains FIGS. 1, 110, 112 and 116 into a multi-level memory. The chip may be split into domains FIG. 1 110, 112, 114, 116 and 118 that control major functions on the chip. In one example the domains would include a safety and security domain 110, a CPU domain FIG. 1, 112, a video display domain FIG. 1, 114, a sensing vision AI domain FIG. 1, 118 and an IO domain FIG. 1, 116. These domains have an associated bandwidth and speed. The method may also include controlling memory access to the plurality of interconnected networked domains via a multi-tier network FIG. 1, 120, 122, 126 based on the multi-level memory via a multi-port DDR controller FIG. 1, 128. The multi-tier network may allow the domains to be connected to one another and to the multi-port DDR access. In this example the safety NOC FIG. 1, 120, CPU NOC FIG. 1, 122 and system NOC FIG. 1, 126 may be connected to one other and the multi-level memory controller FIG. 1, 128. The method may include controlling memory access to sensing vision AI domain FIG. 1, 118, via direct memory access to the multi-port DDR controller FIG. 1, 128. The method may also include receiving a plurality of raw sensor data streams, FIG. 2, cameras 210. The raw sensor streams may comprise one of image data, light imaging and ranging (LIDAR) data, radio detection and ranging (RADAR) data, infrared data, audio data and the like. The method may include resolving the plurality of raw sensor data streams to a plurality of processed sensor data by a plurality of signal processors, in one example shown in FIG. 2, image signal processor 220, computer vision processor 222 and neural net processor 230. The method may further include storing the plurality of processed sensor data in a plurality of sensor data memories FIG. 2, bit transfer memory 224, via the multi-port DDR controller FIG. 1, 128, receiving the plurality of processed sensor data from the plurality of sensor data memories by at least one of the plurality of interconnected networked domains, FIGS. 1, 110, 112 and 116, through the multi-tier network FIGS. 1, 120, 122, 126 and 130 based on the multi-level memory. The method then includes analyzing the plurality of processed sensor data in at least one central processor unit, FIG. 1 CPU domain 112 and outputting the result of the analysis to at least one of a human readable data and a machine actionable data.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A system on a chip, comprising:
   a multi-port DDR controller, wherein at least two ports of the multi-port DDR controller having different access priorities;
   a multi-tier network coupled to the multi-port DDR controller;
   a plurality of interconnected networked domains coupled to the multi-tier network, wherein memory access to the plurality of interconnected networked domains is controlled via the multi-tier network via the multi-port DDR controller;
   a plurality of signal processors that resolves a plurality of raw sensor data streams into a plurality of processed sensor data;
   at least one sensor data memory that stores the plurality of processed sensor data via the multi-port DDR controller;
   at least one central processor unit that analyzes the plurality of processed sensor data to yield a sensor data analysis;
   at least one central data memory that stores at least one result of the sensor data analysis via the multi-tier network; and
   an output interface that outputs the at least one result of the sensor data analysis in at least one of a human readable data and a machine actionable data;
   wherein the plurality of interconnected networked domains comprise at least one of a safety and security domain, a CPU domain, a video display domain and an input output domain.

2. The system on the chip of claim 1, wherein at least one of the plurality of signal processors is at least one of an ARM processor and a RISC processor.

3. The system on the chip of claim 1, wherein at least one of the plurality of signal processors is one of a field programmable gate array, a graphical processor unit, an application specific integrated circuit and a digital signal processor.

4. The system on the chip of claim 1, further comprising at least one random access memory controller coupled to at least one of the plurality of signal processors and at least one random access memory coupled to the at least one random access memory controller.

5. The system on the chip of claim 1, further comprising at least one direct memory access coupled to at least one of the plurality of signal processors, at least one random access memory controller coupled to the at least one direct memory access and at least one random access memory coupled to the at least one random access memory controller.

6. The system on the chip of claim 1, further comprising at least one storage controller coupled to at least one of the at least one central processor and at least one flash memory coupled to at least one storage controller.

7. The system on the chip of claim 1, wherein at least one of the raw sensor data streams comprise at least one of image data, LIDAR data, radar data, infrared data and audio data.

8. The system on the chip of claim 1, wherein at least two of the networks of the multi-tier network are heterogeneous.

9. The system on the chip of claim 1, wherein at least one of the plurality of signal processors and the at least one central processor unit are heterogeneous.

10. The system on the chip of claim 1, wherein the at least one sensor data memory and the at least one central data memory form a multi-level memory.

* * * * *